United States Patent [19]
Rich

[11] Patent Number: 5,960,790
[45] Date of Patent: Oct. 5, 1999

[54] MODULAR SOLAR ENERGY COLLECTION SYSTEM

[76] Inventor: Albert Clark Rich, 4808 Robertson Ave., Carmichael, Calif. 95608

[21] Appl. No.: 09/108,017

[22] Filed: Jun. 30, 1998

Related U.S. Application Data

[60] Provisional application No. 60/071,274, Dec. 22, 1997.
[51] Int. Cl.⁶ .................................................. F24J 2/46
[52] U.S. Cl. ........................ 126/623; 126/655; 126/704; 126/906
[58] Field of Search .................................. 126/704, 623, 126/906, 651, 655

[56] References Cited

U.S. PATENT DOCUMENTS

| | | | |
|---|---|---|---|
| 4,122,829 | 10/1978 | Lowe et al. | 126/704 |
| 4,205,657 | 6/1980 | Kelly | 126/425 |
| 4,373,514 | 2/1983 | Lois | 126/438 |
| 4,407,269 | 10/1983 | Hopper | 126/906 |
| 4,426,999 | 1/1984 | Evans et al. | 126/906 |
| 4,453,534 | 6/1984 | Kazimir | 126/420 |
| 4,823,771 | 4/1989 | Menning | 126/448 |
| 4,930,492 | 6/1990 | Rich | 126/420 |
| 5,143,052 | 9/1992 | Case | 126/415 |
| 5,572,988 | 11/1996 | Walton | 126/652 |

FOREIGN PATENT DOCUMENTS

| | | | |
|---|---|---|---|
| 3213882 | 11/1982 | Germany | 126/655 |
| 57-019557 | 2/1982 | Japan | 126/623 |
| 59-158943 | 9/1984 | Japan | 126/623 |

*Primary Examiner*—James C. Yeung
*Assistant Examiner*—Sara Clarke
*Attorney, Agent, or Firm*—Leland K. Jordan

[57] ABSTRACT

A light weight modular solar water heater whereby the entire solar collector of the system can be shipped in a single box by a low cost parcel service (like UPS) which is designed to be easily assembled and installed by one person such as a homeowner, handyman or installer hereinafter referred to as "installer" wherein the preferred embodiment the collector module is shipped in a single box with the frame and solar energy absorber in two sections using a three piece glazing and trim assembly allowing for the collector end sections to be fully assembled at the factory and allowing for the center section to be open for the solar collector installer to have easy access to connect the frame and absorber sections and may be attached to the roof using a unique tabbed mounting rails which allow for the attachment to the roof of multiple collectors using a tabbed U shaped bracket between collectors with absorber connections made using couplers which pull or "float" out of the collector after shipping for connection to each other and the piping to and from the storage tank and pump and for the installer to easily finish the collector by installing the center trim and glazing section.

8 Claims, 4 Drawing Sheets

SHIPABLE SOLAR WATER HEATER

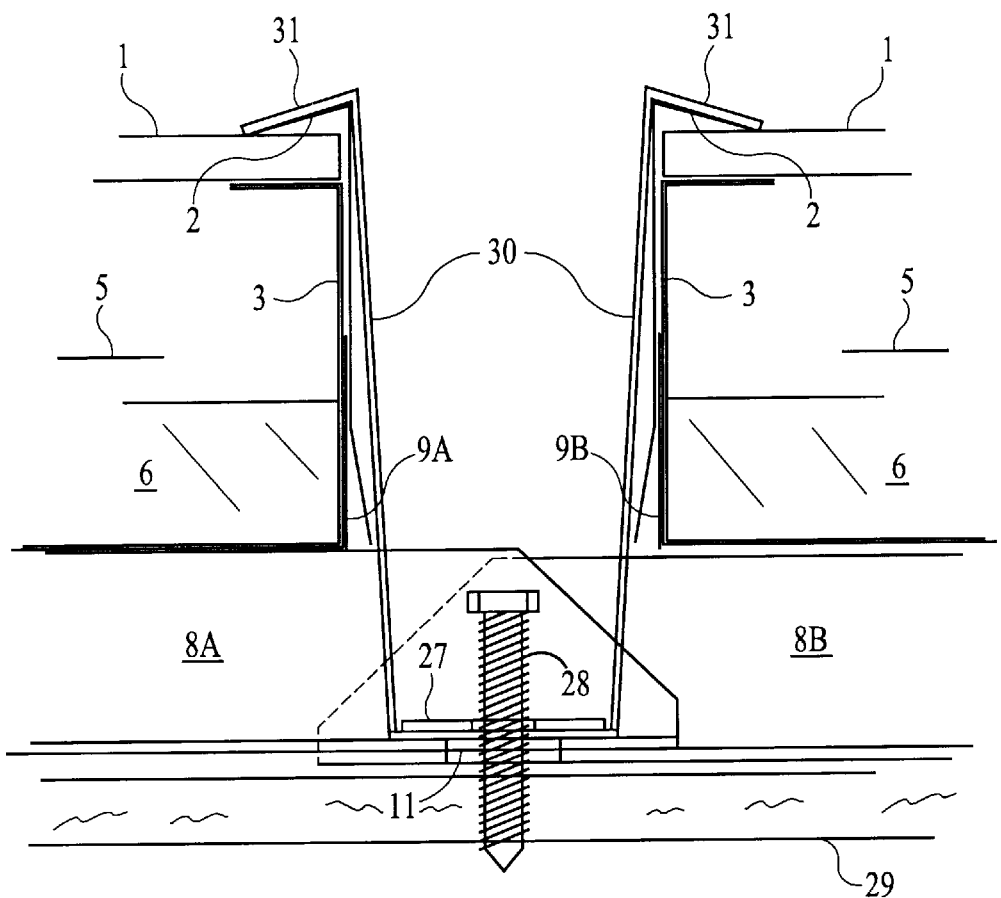
FIG. 9
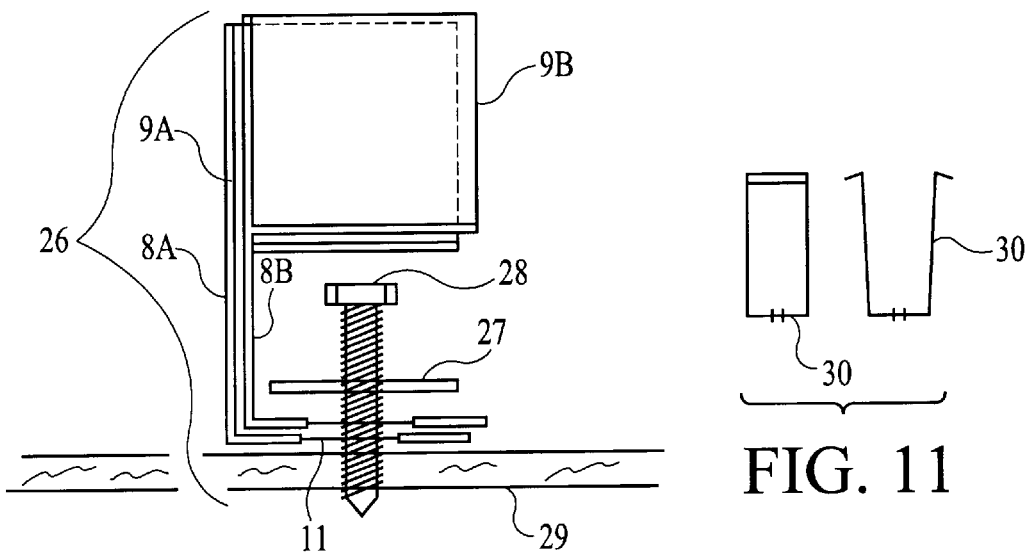
FIG. 10
FIG. 11

MODULAR SOLAR ENERGY COLLECTION SYSTEM

CROSS-REFERENCE TO RELATED APPLICATIONS

This application is a non-provisional application of a previous provisional application Ser. No. 60/071,274, filed Dec. 22,1997.

BACKGROUND OF THE INVENTION

1. Field of the Invention

The present invention relates to an improved solar thermal collector which allows for the low cost shipment and easy assembly of the system for greater cost effectiveness and practical application by the user.

2. Description of the Related Art

Traditional solar water heating collectors are large, heavy, awkward to deal with as well as expensive to ship and install. The UPS2001 solar water heater solves all of these problems. Past attempts to make solar systems low cost to ship have resulted in tiny collectors which require more than one collector to be of any usable effect at all. For their size, they were still quite heavy, awkward to install and required excess plumbing due to multiple collectors. Representative examples of prior art collectors are the "SunEarth" solar energy collector whose smallest collector, the 22s/f EMC 38 solar energy collector weighs in at 90 lb., the "Heliodyne" 32 s/f GOBI 408 solar energy collector weighing in at 133 lb. and the "AET" 21s/f AE-21 solar energy collector weighing in at 90 lb. None of these collectors can be installed by one person or shipped by a low cost parcel service like UPS.

As cost effectiveness is a vital aspect in a customers consideration for the purchase of a solar water heater, anything that adds to cost and difficulty are enemy to the success of these products in the marketplace. Shipping for a standard system can easily exceed $100.00, for a UPS shipped system as low as $25.00. Two or more people are required to safely install traditional solar water heaters, for this UPS system, one capable person can do it easily due to the decreased size and weight and clever modular design.

The truly great difference is in the clever design which makes the system particularly "user friendly" and the embodiments allowing for this user friendliness is what this patent seeks to protect. This design is the results of years of intensive work in the solar water heating field and solves crucial problems such as costly shipping, difficult and dangerous handling due to weight and awkward dimensions, difficult installations due to awkward mounting systems including the need for nuts and bolts, numerous tools and copper pipe soldering in the installation of the collector and system that have thwarted the mass marketing of solar water heaters over the last two decades. This invention addresses all these problems and solves them in an elegant, modular manner which allows for great flexibility by allowing for the system to be as large or as small as is needed by the user.

BRIEF SUMMARY OF THE INVENTION

The objects and advantages of the invention will be set forth in art in the description which follows and in part will be obvious from the description, or may be learned by practice of the invention. Additional objects and advantages of the invention may be realized and attained by means of the instrumentalities and combinations particularly pointed out in the specifications and appended claims. Additionally working prototype collectors incorporating the invention are available for inspection.

To achieve the forgoing objects and in accordance with the purpose of the invention, as embodied and broadly described herein, there is disclosed a solar thermal collector comprising:

A solar absorbing means, which can be two parts communicating with a connection means, communicating with an insulating material means, which can be two parts, which communicates with a bottom and side frame means, which can be two parts, which communicates with the joiner part means which communicate with a twin walled transparent plastic glazing means which can be three parts.

A side trim means, which can be three parts, which holds down the glazing means, which can be a three part twin walled plastic material, which communicates with glazing mullion means and at once communicating with the frame means, which can be two parts.

A roof mounting means which can be three parts, communicating with a side frame means, which can be two parts, and the side trim means which can be three parts.

The advantages of the invention include but are not limited to the unique modularity and light weight of the collector which allows it to be inexpensively shipped and then be easily assembled and installed at the user end by one or more people using a few common tools and basic skills.

The use of the system includes, but is not limited to, heating water for domestic or commercial use, heating water for domestic or commercial space heating or air conditioning, heating water for domestic or commercial spa or pool heating, heating water for fish tanks or green house or other agricultural or livestock or sanitation needs at any location with adequate solar insolation (the amount of available sunlight a particular location) in the world.

BRIEF DESCRIPTION OF THE DRAWINGS

The invention will be more fully understood from the following detailed description thereof taken in connection with the accompanying drawings which form a part of this application and in which:

FIG. 9 is a sectional side view of two collectors showing an end view of how the tabbed U bracket is installed over the overlapping roof mounting rails. The roof mounting rail tab is shown in position between the collector frame and trim without the need of fasteners. The view shows the components being held in place by a single lag and large washer.

FIG. 10 is a cross sectional end view of the roof mounting rails overlapping each other and being held in place by a single lag and large washer. The roof mounting rail tab is also shown.

FIG. 11 shows a small side and end view the tabbed U bracket to clarify its shape.

DRAWING NUMBERED CODE SCHEDULE

Figure 1:
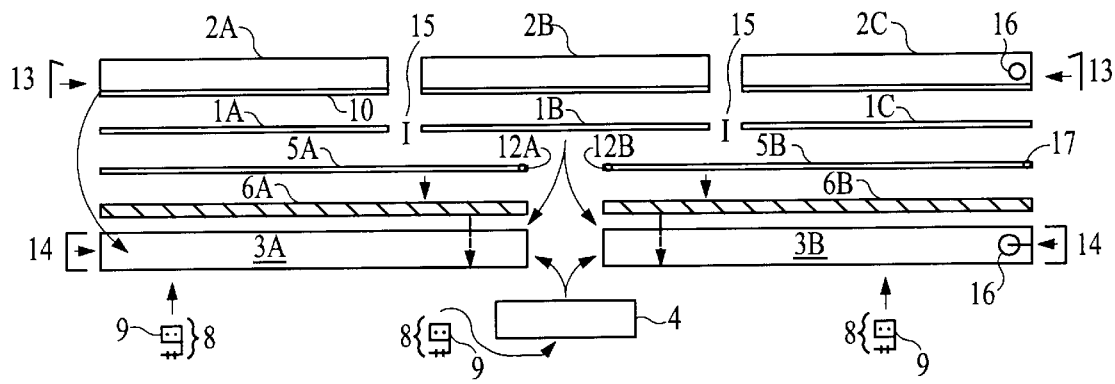
FIG. 1 is a side view drawing showing the major collector components and locations embodied in the split frame design of the present invention.

1 LEXAN™ glazing parts A end, B center, and C end, or other glazing

2 Side trim parts, A end, B center, and C connection end

3 Split frame left and right side frame parts A end, and B end, may also be the sides and bottom and may include the end frame part 14 of the collector

4 Center joiner part for connecting the side frame parts A and B

5 Solar absorber parts A end, and B connection end

6 Insulation material, A end, and B end

7 Fastening screws for fastening joiner part 4 which connects side frame parts A and B

8 (Tabbed) mounting rails to secure collector unit to roof with an air space

9 Tab part of mounting rail which goes between the collector frame 3 and trim 2 and being secured with fasteners 23

10 Bend in trim 2 which allows for easily fitting tab 9 between trim 2 and frame

11 Mounting hole in mounting rails 8 to allow fastening of lag 28 into roof

12 Absorber center connection unions end A and end B

13 End trim parts

14 End frame parts

15 Mullion parts for connecting glazing parts 1

16 Hole in connection end side trim parts 2C and side frame parts 3B

17 Union used in the final connection of absorber 5 to another absorber or to the feed or return lines

18 Connecting spacer tube between absorber 5 and union 17

19 Line showing proper spacing placement of union 17 directly over mounting hole 11

20 Location of pipe insulation covering and protecting hole 16

21 Adhesive tab strip used for shipping and protecting hole to absorber 5 and allowing for easily pulling union 17 to its proper position 19 over hole 11

22 Fastening screw for fastening trim part 2 to frame part 3

Figure 3:
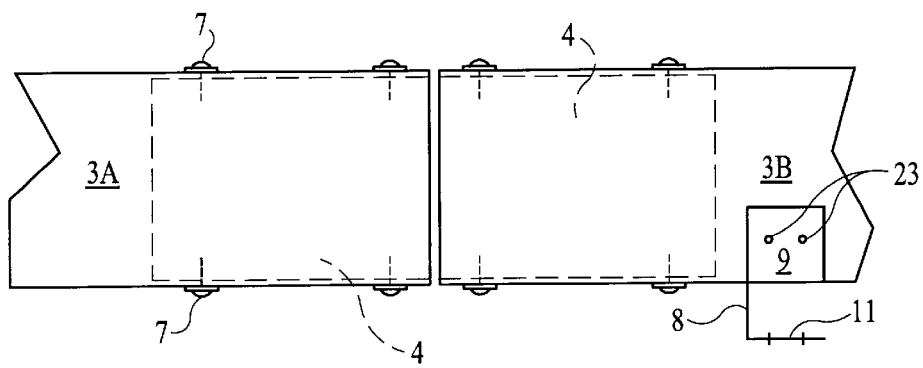
FIG. 3 is a side view drawing of the center ends of the two side frame members being connected by the joiner section as well als end view of the roof mounting rail attachment.

23 Fastening screw (FIG. 3 shows only screw holes) for fastening mounting rails 8 onto collector by going through trim part 2 and tab part 9 and into frame part 3

24 Grommet seal to prevent contact of dissimilar metals through holes

25 Union connection of union part 17A and 17B between collectors

26 Assembly of two mounting rails from two collectors being attached to roof with lag 28 through large washer 27, tabbed U bracket 30 and mounting rails 8A and 8B

27 Large washer for lag 28

28 Lag for fastening mounting rails 8 through large washer 27 with or with out tabbed U bracket 30

29 Roof surface to which entire collector assembly is being attached

30 Tabbed U bracket used between entire collector assemblies to securing them both without screw fasteners (except in high wind areas where screw fasteners are needed)

31 Tab on the tabbed U bracket 30 going over top of trim parts 2A, B, and C to hold down entire collector assembly

32 Coated wire used to secure absorber assembly 5 to insulation board 6 33 Illustrates two collectors assembled with union connection 25 and mounted to roof surface 29

DETAILED DESCRIPTION OF THE INVENTION

Reference will now be made in detail to a preferred embodiment of the invention, an example of which is illustrated in the accompanying drawings. Wherever possible the same reference numbers will be used throughout the drawings to refer to the same or like parts.

Referring to FIG. 1, the solar collectors main components of the present invention are illustrated in a drawing showing their approximate two dimensional relationships to each other.

The solar energy collector FIG. 1, is factory assembled in two halves comprising a solar energy absorbing means 5A and 5B contained in a housing comprised of two sets of frame parts 3A and 3B and a set of end frame parts 14 and glued or otherwise attached to insulation material 6A and 6B respectively. These half assemblies are then covered on each end with glazing parts 1A and 1B which is held in place with end trim part 13 and mullion part 15. Frame parts 3A and 3B may be made in one part including a bottom or in two, left and right, frame parts or in any combination.

These components are generally factory assembled as two halves with and then joined in the center at the time of installation to each other with joiner strip 4 and with absorber means 5A and 5B being coupled with connection union ends 12A and 12B with this assembly then being attached to the roof surface using generally 3 or more tabbed mounting rails 8 with tabs 9 securing side frame parts 3A and 3B by being inserted between frame part 3 and trim part 2 with the unfinished center section then being covered by the installer with glazing part 1B by being inserted and thus secured into mullions 15 and further held in place by left and right side trim parts 2B.

Figure 7:
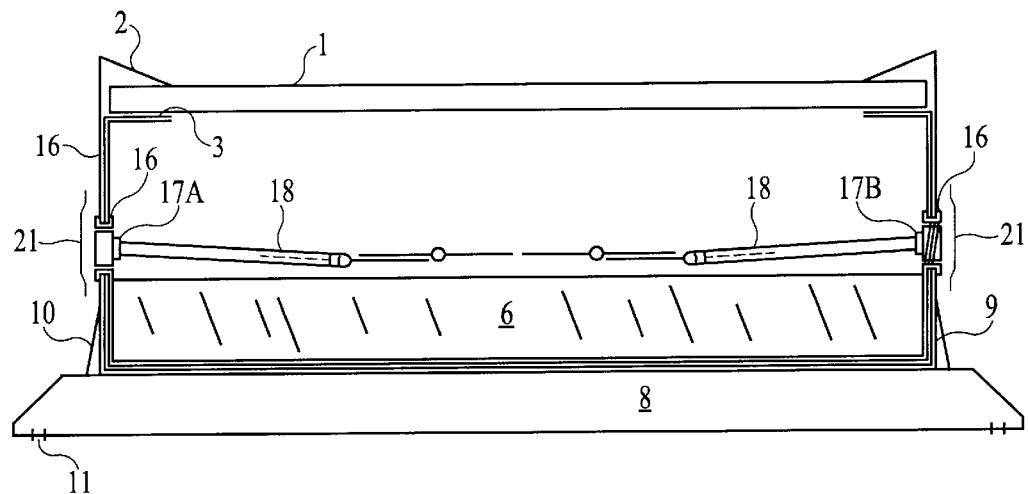
FIG. 7 is a sectional view of the collector end showing the floating coupler flush with the side of the collector and therefor in the "shipping" position. Note that the absorber fin slips securely under the next fin when in the shipping position. Also shown is the "easy pull" adhesive strip which allows the customer to simply pull on the tab on the end of the strip and pull the floating coupler out of the box for assembly. The easy pull strip also serves to protect the absorber ends from getting any foreign matter in them.
Figure 8:
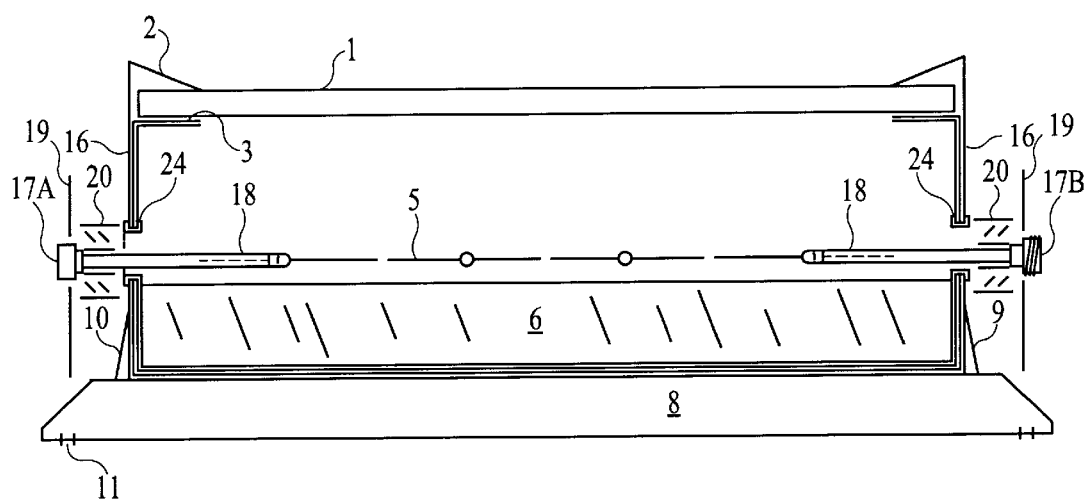
FIG. 8 is a sectional view of the collector near the end showing the floating coupler in the ready to assemble, out position. Also shown is insulation covering the collector hole for the floating coupler and that in the out position, the floating coupler is directly over the mounting bracket lag hole.

The absorber connection end frame and trim hole 16 can be at either end and has provision for union 17 to fully go in and out of it as elaborated on in FIGS. 7 and 8.

Figure 2:
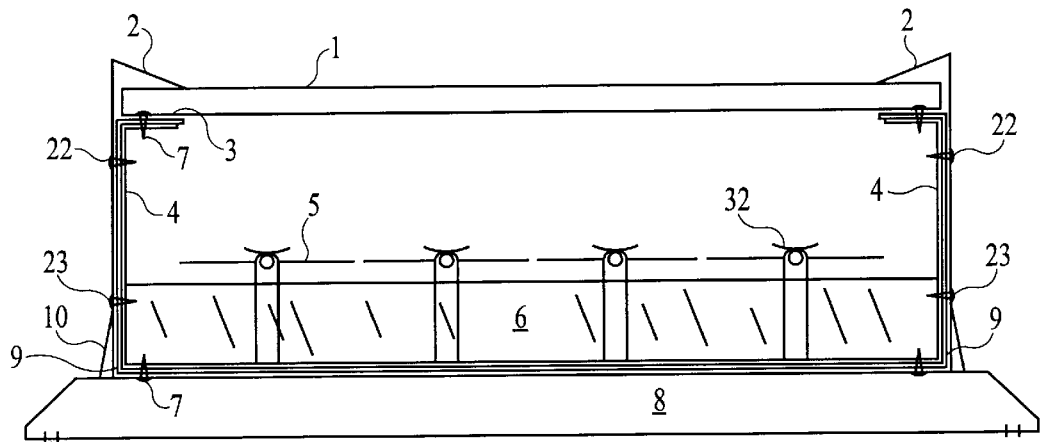
FIG. 2 is a sectional end view drawing of the collector in its completed form showing the positioning of all components and attachments with the two half sections connected by the joiner section and the roof mounting rail attached.

Referring to FIG. 2, cross-sectional detail is illustrated of the solar collectors center section where the connection of the two solar collector halves is made. Absorber center section unions 12A and 12B are not shown to better illustrate the coated wire technique 32 used to secure absorber assembly 5 to insulation board 6. In the preferred embodiment absorber assembly 5 is made of two sets of 4 or more fintubes connected in the center by unions 12.

Frame part 3 is illustrated as a one piece part but can also be two parts including a left and right and without a bottom and being glued or otherwise secured to insulation material 6. Frame part 3 may also be made as one part including end frame part 14.

Frame part 3 is secured to center joiner section 4 which is placed on the inside of frame part 3 with fastening screws 7 being screwed through the top and bottom of the two parts. Fastening screw 22 first passes through trim part 2, which protects and secures glazing part 1, and then into frame part 3 and at the center of the solar collector, through solar collector center joiner section 4.

The assembled collector as shown in FIG. 2 is attached to mounting rail 8 by attachment of the mounting rail tab inserted between frame part 3 and trim part 2 and secured by fastening screw 23 with mounting hole 11 being the location of attachment to the roof surface. When used, an outward bend 10 in trim part 2 facilitates the easy insertion of mounting rail 8 between frame part 3 and trim part 2.

Referring to FIG. 3, detail is shown of frame parts 3A and 3B being joined by center joiner part 4 from the inside and secured together on the top and bottom by fastening screws 7. Mounting rail 8 is shown with its tab 9 uncovered against frame part 3 with the approximate location of the holes which fastening screws 23 will make when tab 9 is attached to mounting rail 8 with lag hole 11.

Figure 4:
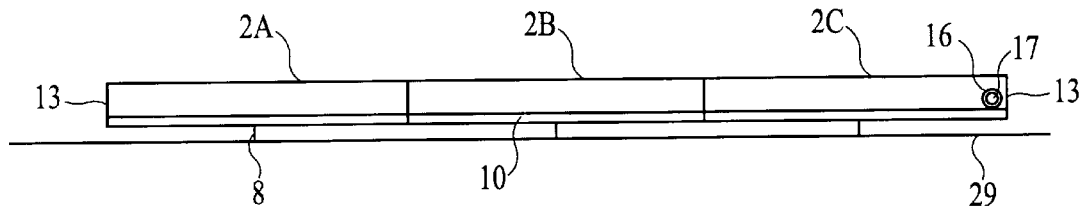
FIG. 4 is a full side view of the assembled collector showing the installed side trim as well as the approximate location of the mounting brackets and "floating couplers".

Referring to FIG. 4, a side view is illustrated showing the assembled collector and the assembled relationship of trim parts 3A, B, and C and end trim parts 13 with the entire FIG. 4 collector assembly being secured to roof surface 29 with mounting rails 8.

Figure 5:
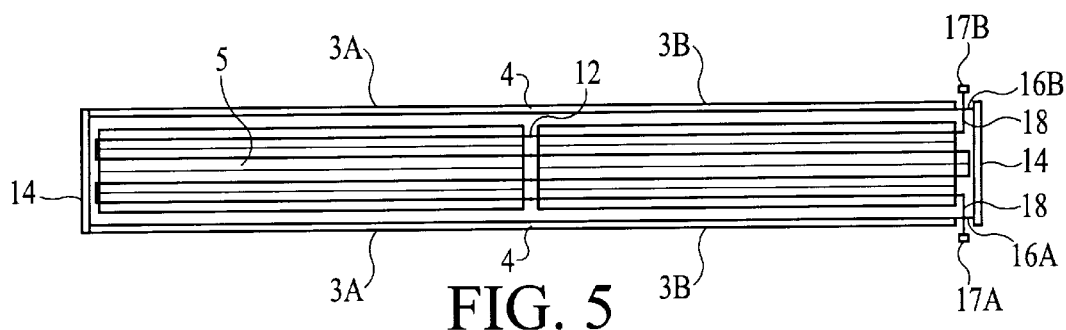
FIG. 5 is a top view of the collector showing the assembled frame with the collector side rail joiner section and absorber halves attached but prior to the installation of any trim, glazing or mullions. This view shows the layout of the frame, serpentine copper absorber and location of unions.

Referring to FIG. 5, a top view is shown of the solar collector without trim or glazing to expose the top of frame parts 3A, 3B and 14 showing the connected center joiner part 4 and absorber 5 center connection unions 12 connecting ends A and B with unions 17A and B connected to absorber 5 by connecting spacer tube 18 through holes 16A and B. As illustrated in FIG. 5, the solar absorber 5 is illustrated as a serpentine fin tube unit going in its assembled configuration in one continuous end to end run generally 4 or more times. This absorber 5 can be made of different materials including EPDM or other rubber or plastic or metal material and can also be made in various configurations including but not limited to parallel flows with fluid entering through a hole 16 at one end and exiting through another hole 16 at the other end.

Figure 6:
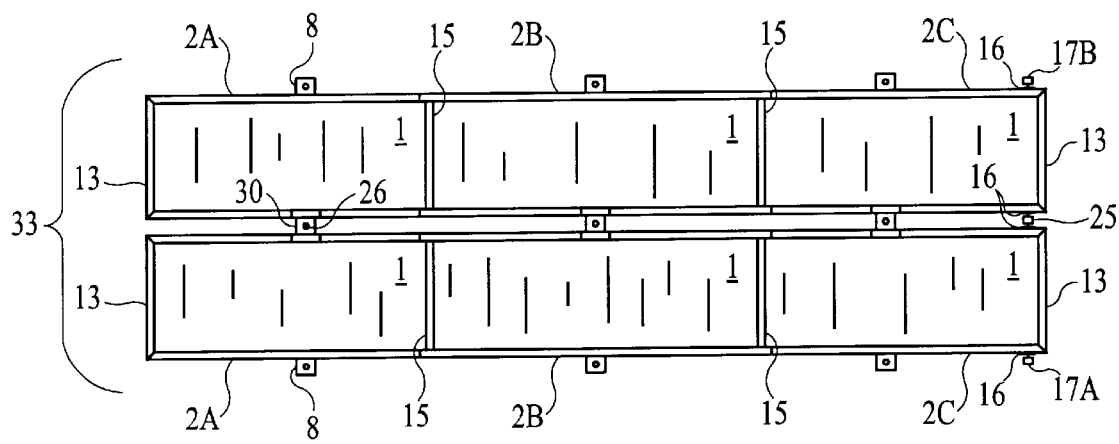
FIG. 6 is a top view of two completed collectors, fully assembled with the floating coupler connected, and showing the locations of the connected mounting brackets with the tabbed U brackets holding the collectors in place, side by side, without the need of screws.

Referring to FIG. 6, a top view is shown to illustrate how two or more collectors 33 are installed onto the roof surface using two mounting rails 8 over each other 26 and being held down and in place between the collectors by tabbed U bracket 30, as well as the spatial relationship of all trim parts 2A, B, C, and 13, mullions 15, glazing 1, absorber union connections 25, 17A and B through holes 16 in the final installation.

Referring to FIG. 7 and 8, as referenced in FIG. 1, the absorber connection end frame and trim hole 16 can be at either end and has provision for union 17 A and B to fully go in and out of hole 16 which uses a grommet 24 to prevent the absorber 5 connecting spacer tube 18 from directly contacting frame 3 and/or trim 2 parts. FIG. 7, shows a cross sectional view of the solar collector illustrating the outer absorber 5 fintube securely tucked under the adjoining fintube and in position to be shipped with connecting unions 17A and B flush with the side trim 2 and optionally being held in place by adhesive tab strips which cover and protect the hole to the absorber 5 and the collector hole 16 and when pulled off pull out unions 17A and B to position unions 17A and B and connector tube 18 and the connecting absorber fintube part of absorber 5 out into position 19 over mounting rail 8 hole 11 as illustrated in FIG. 8.

Referring to FIG. 9, a cross-sectional drawing of the inside edges of two collectors illustrates the tabbed U bracket 30 method of securing the collector in place on tabbed mounting rails 8A and 8B with tab 9 preventing any lateral movement as it is securely held in place by being slid between trim part 2 and frame part 3. Tabbed U bracket 30 is secured to the roof surface 29 by a lag 28 and large washer 27 with the lag going through hole 11 of overlapping mounting rails 8A and B.

Referring to FIG. 10, is an end cross-sectional view of tabbed mounting rails 8A and 8B overlapping each other and being secured with a lag 28 which goes through large washer 27 on its way through roof surface 29.

Referring to FIG. 11, is a side and edge view of tabbed U bracket 30 to clearly show its shape independent of a drawing.

It will be apparent to those skilled in the art that various modifications and variations can be made in the solar collector design of the present invention and in constructing this solar collector without departing from the scope or the spirit of the present invention. Other embodiments of the invention will be apparent to those skilled in the art from consideration of the specification and practice of the invention disclosed herein. It is intended that the specification and examples be considered exemplary only, with a true scope and spirit of the invention being indicated by the following claims.

Examples of this invention include, but are not limited to, the following for which a true full sized operating prototype has been made to demonstrate and prove some of the following:

1. A modular solar collector with a split frame as shown in FIGS. 1, 2, 3 and 5 to facilitate shipping via low cost parcel service which is under 130 total inches in total girth and length and is under 70 pounds in English weight.
2. A light weight, effectively sized, split frame solar collectors that can be quickly and easily assembled using the unique "split frame" with or without a joiner section as shown in FIGS. 1, 2, 3 and 4 and with absorber and inlet, outlet union or connection design as shown in FIGS. 4, 5, 6, 7, and 8.
3. The solar collector module in use with an "open loop" pressurized typical configuration including mist vent, isolation, and drain valves and pressure relief valve or a "closed loop" low or no pressure typical configuration including heat exchanger, charging valves, mist vent and pressure relief valve using a nontoxic antifreeze or other freezeproof fluid using a low powered AC or DC motorized or driver powered pump which may or may not be Photovoltaic powered.
4. The solar collector built so an assembler can place the collector "half sections" end to end with the absorber unions or connections facing each other as shown in FIG. 6, and with two "joiner sections", or similar, that are then slid half way, unless pre-attached, into the collector half section "frame rails" and then screwed or otherwise attached to the frame rail the other half section then being slid into the joiner section until they fully go together and the frame rails touch with the joiner section then screwed or otherwise attached to the other half section frame rail as shown in FIG. 3, with the unions then tightened.

5. The solar collector designed to allow for convenient access to the unions or connection area in the center using a three section glazing cover and trim as shown in FIG. 1, with the end sections being shipped fully assembled and the center section, comprised of one glazing piece and two trim pieces, being assembled by the installer.

6. The solar collector generally using at least three unique "tabbed mounting rails" which are predrilled for attachment into the roof as shown in FIGS. 1, 2, 3, 4, 6, 7, 8, 9, and 10. These rails are also specially designed to fit into each other so that additional collectors can be easily added to the system or to allow for the panels to be tilted if necessary.

7. A solar collector design whereby the trim piece goes part way to all the way to, or near the bottom edge of the collector and is bent out to allow for the easy insertion of the mounting rail "tab" under it having the tab collector attachment screws go through both the trim and frame materials as shown in FIG. 2,3,7,8 and 9.

8. The collector including a "floating coupler" as shown in FIGS. 7 and 8 which allows for the collector inlet and outlet coupler to "float in" flush with the collector side wall to permit shipping in a smaller box and also allows for simple connection of multiple collectors for easy system enlargement using a unique "tabbed U bracket" as shown in FIG. 6, 9 and 11, which is a unique panel mounting system allowing two or more panels to be secured to the collector mounting rails with the one piece tabbed U bracket attached by the collector mounting lag as detailed in FIG. 9.

9. A modular collector system components of which are shown in FIGS. 1 through 11, which when fully assembled weighs less than 40 pounds, is 12 feet in length, 20 inches in width and, 3.5 inches in thickness and when in the unassembled shipping mode consists of two 6 foot long by 20 inch wide by 3.5 inch thick, partially assembled frame modules with end trim and glazing fully installed with 4 unions at the center to connect the absorbers and with one of the 6 foot long modules having an inlet and outlet hole at the far end to allow for the absorber's connecting tubes to be potentially connected to adjacent collector modules for enlargement with the lines ultimately going to and from the storage tank using a unions or other connectors.

It is to be understood that the embodiments of the invention disclosed herein are illustrative of the principles of the invention and that other modifications may be employed which are still within the scope of the invention. Accordingly, the present invention is not limited to those embodiments precisely shown and described in the specification but only by the following claims.

What is claimed is:

1. A solar energy collection system suitable for collecting and converting solar energy into thermal energy, the collection system comprising:

a first collector side frame member having first two generally parallel opposing sides extending upwardly from a first bottom layer;

a first solar energy absorber half section enclosed by said first side frame member;

a second collector side frame member having second two generally parallel opposing sides extending upwardly from a second bottom layer;

a second solar energy absorber half section enclosed by said second side frame member;

center joiner parts adapted to secure the first side frame member to the second side frame member;

absorber connection unions adapted to secure the first and second solar energy absorber half sections;

tabbed mounting rails adapted to mount the first and second side frame members to a roof; and, a plurality of trim parts adapted to be secured to the exterior surfaces of the side frame members.

2. The solar energy collection system of claim 1 wherein the solar energy absorber half sections further comprise an end union adapted to connect with water feed or return lines.

3. The solar energy collection system of claim 2 further comprising a removable adhesive strip positioned over the absorber connection unions so that the unions may be readily positioned to facilitate connecting together a series of solar energy absorbing panels.

4. The solar energy collection system of claim 1 wherein the first solar energy absorber half section is separated from the bottom of the first side frame member by a layer of insulation, and wherein the second collector side frame member is separated from the bottom of the second side frame member by a layer of insulation.

5. The solar energy collection system of claim 1 wherein the solar energy absorbing panels comprise a serpentine shaped copper absorber.

6. A method for assembly of a solar energy collection system suitable for collecting and converting solar energy into thermal energy, the method comprising:

providing a first collector side frame member having two generally parallel opposing sides extending upwardly from a bottom layer;

enclosing a first solar energy absorber half section within the opposing sides and bottom layer of said first side frame member;

providing a second collector side frame member having two generally parallel opposing sides extending upwardly from a bottom layer;

enclosing a second solar energy absorber half section within the opposing sides and bottom layer of said second side frame member;

securing the sides of first collector side frame members to the sides of second collector side frame member using center joiner parts;

securing the first and second solar energy absorber half sections using absorber connection unions;

using tabbed mounting rails to mount the first and second side frame members to a roof; and, attaching a plurality of trim parts to the exterior surfaces of the side frame members.

7. The method for assembly of a solar energy collection system of claim 6 wherein the solar energy absorber half sections further comprise an end union adapted to connect with water feed or return lines.

8. The method for assembly of a solar energy collection system of claim 6 further comprising positioning removable adhesive strips over the absorber connection unions to facilitate connecting together a series of solar energy absorbing panels.

* * * * *